March 25, 1930.  M. DOERSCH  1,752,070
CULTIVATOR
Filed Dec. 5, 1927  2 Sheets-Sheet 1

Inventor
Maurice Doersch
By Clarence A. O'Brien
Attorney

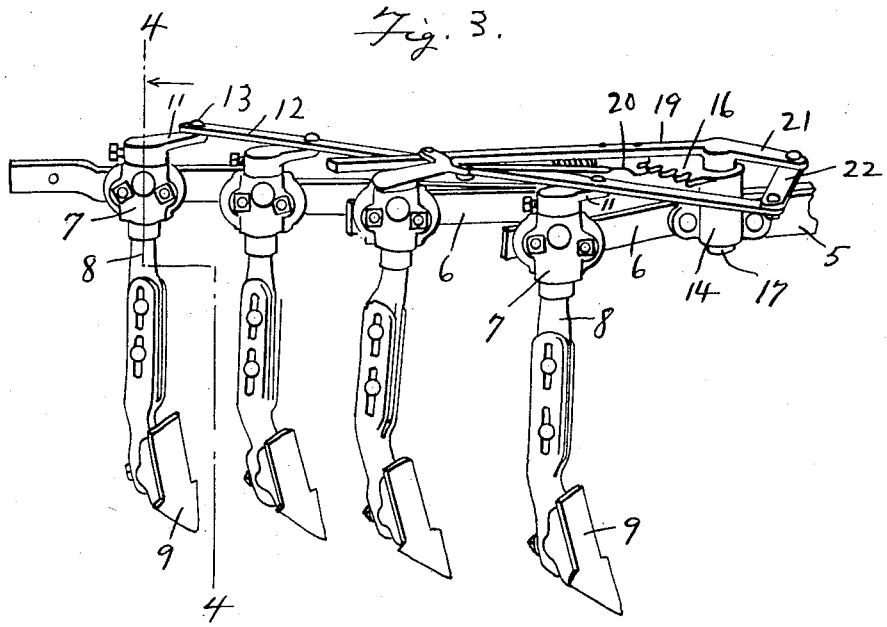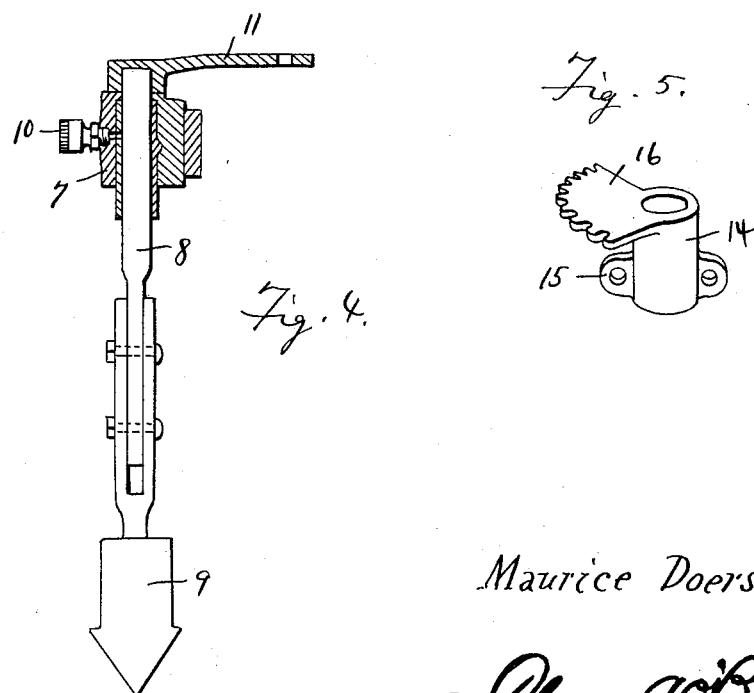

Patented Mar. 25, 1930

1,752,070

UNITED STATES PATENT OFFICE

MAURICE DOERSCH, OF MOUNT HOREB, WISCONSIN

CULTIVATOR

Application filed December 5, 1927. Serial No. 237,831.

The present invention relates to a cultivator of the eight shovel riding corn type and has for its prime object to provide a structure wherein the shovels may be adjusted at various angles to accommodate the sloping of the ground being worked.

Another very important object of the invention resides in the provision of a structure of this nature which is easy to manipulate, inexpensive to manufacture, strong and durable, and thoroughly efficient and reliable for the purpose intended.

With the above and numerous other objects in view as will appear as the description proceeds, the invention resides in certain novel features of construction, and in the combination and arrangement of parts as will be hereinafter more fully described and claimed.

In the drawings:

Figure 3 is a perspective view of the improved cultivating unit;

Figure 4 is a detail sectional view taken substantially on the line 4—4 of Figure 3, and Figure 5 is a perspective view of a bearing member used in the construction.

Figure 1:
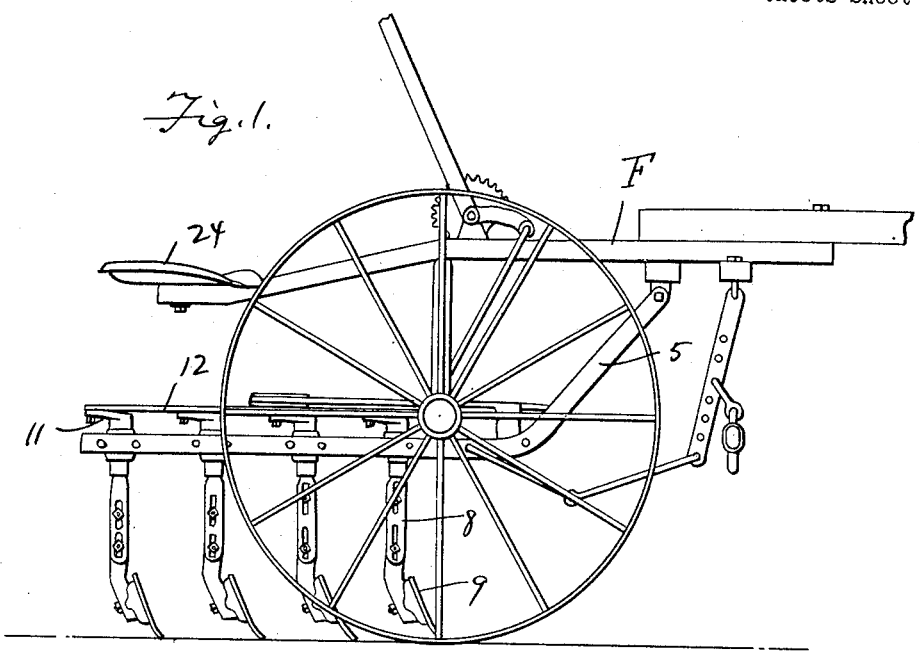
Figure 1 is a side elevation of a cultivator embodying the features of my invention.
Figure 2:
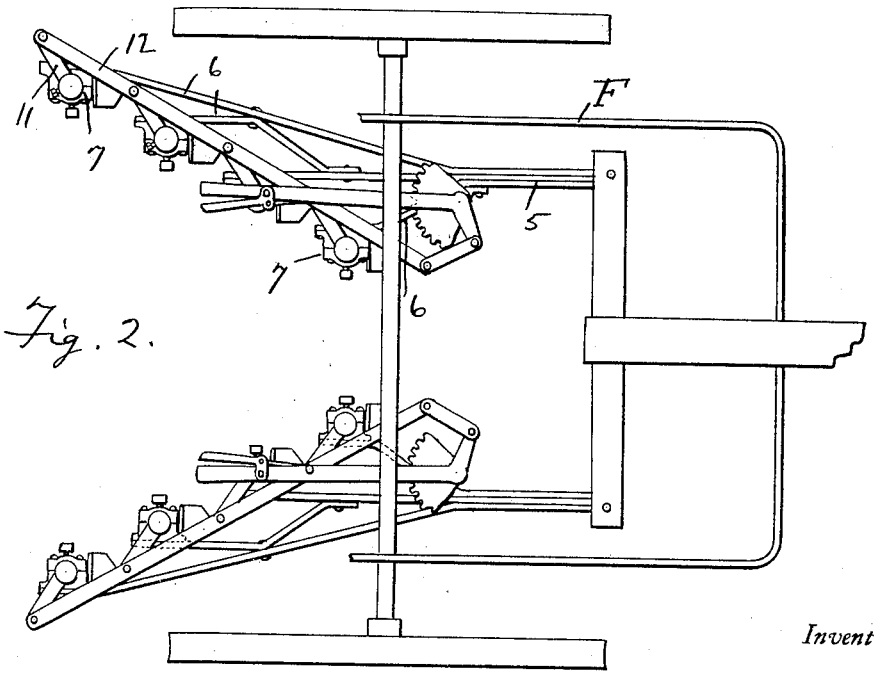
Figure 2 is a fragmentary top plan view thereof.

Referring to the drawings in detail it will be seen that the letter F denotes generally a riding corn cultivator frame of conventional construction having engaged therewith a pair of beams 5 in the usual well known manner. These beams 5 are formed with a plurality of branches 6, in the present instance there being four branches to each beam. On the end of each branch 6 there is a bearing 7 for rotatably receiving an adjustable shank 8 having a cultivator shovel 9 at the lower end thereof. Suitable lubricating means 10 are associated with the bearing 7. A crank 11 is attached to the upper end of each shank 8 above the respective bearing 7. A rod 12 is pivotally engaged as at 13 with the extremities of the crank 11 on the shank 8 journaled in the bearing 7 of the branches of each beam. A bearing bracket 14 is formed with ears 15 secured to the respective beam 5 and is provided with a notched segment 16. A shaft 17 is rotatable in the bearing 14 and has an operating lever 19 provided with a detent structure 20 cooperable with the notch segment 16. The shaft 17 is further provided with an arm 21 with which is engaged a link 22 also engaged with the adjacent extremity of the rod 12.

The lever 19 extends rearwardly so as to be accessible from the seat 24 on the frame F.

The present example of this cultivator has two sets of four shovels each. There are two levers 19 one for each set of cultivator shovels. These levers operate from the seat of the cultivator. By swinging the levers the stepped shovels may be turned at the same time to throw the dirt up or down the hill when cultivating on a side hill. The upper shovels will not crowd the dirt against the corn while the corn is small. The lower shovels will keep the dirt up against the corn so that the roots will not be left bare. The cultivators now in common use have a tendency to work the other way, the lower shovels on the ordinary cultivators work the dirt away from the corn instead of up to it.

With the present example of the cultivator, when the end of the row is reached, by reversing the levers, the shovels will also throw the dirt uphill again going back the other way. Any suitable shovel may be used.

It is thought that the construction, operation and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a cultivator, the combination of a beam, said beam adjacent one end thereof being provided with a plurality of branches extending from one side thereof, said branches being disposed in a horizontal plane, and each of said branches terminating at their outer end in a bearing, vertically disposed longitudinally adjustable shafts having their upper ends rotatably mounted in said bearings, said shafts at their lower ends having bevels secured thereto, points detachably mounted on the upper end of said shaft, a connecting rod pivotally secured to the free end of each of said cranks, a bearing bracket secured to said beams, a vertical shaft journaled in said bearing bracket, said bearing bracket having a notched segment formed integrally therewith and extending laterally therefrom, said shaft being provided on the upper end thereof with an arm formed integrally therewith and extending laterally therefrom, a link pivotally connected at one end to one end of said arm and at its opposite end to one end of said connecting rod, said shaft being further provided with a lever formed integrally therewith and extending laterally therefrom for movement in a horizontal plane, and a detent structure carried by said lever and cooperable with said notched segment.

In testimony whereof I affix my signature.

MAURICE DOERSCH.